United States Patent
Porter

[19]

[11] Patent Number: 5,857,938
[45] Date of Patent: Jan. 12, 1999

[54] MANUAL SHIFT CONTROL ASSEMBLY WITH A REVERSE LOCK POSITION

[75] Inventor: Donald Kevin Porter, Haslett, Mich.

[73] Assignee: General Motors Corporation, Detroit, Mich.

[21] Appl. No.: 901,728

[22] Filed: Jul. 28, 1997

[51] Int. Cl.[6] .............................. F16H 59/68; F16H 59/74
[52] U.S. Cl. ........................... 477/99; 70/247; 74/473.21; 74/273.22
[58] Field of Search .................. 477/99, 126; 74/473.19, 74/473.21, 473.22; 70/247, 252

[56] References Cited

U.S. PATENT DOCUMENTS

| | | | |
|---|---|---|---|
| 1,827,732 | 10/1931 | Conlan | 70/252 X |
| 5,551,266 | 9/1996 | Behrens | 70/247 |
| 5,566,583 | 10/1996 | Suzuki | 477/99 X |
| 5,647,818 | 7/1997 | Moody | 477/99 |
| 5,651,290 | 7/1997 | Osborn et al. | 74/473.22 |

*Primary Examiner*—Charles A. Marmor
*Assistant Examiner*—Sherry Lynn Estremsky
*Attorney, Agent, or Firm*—Donald F. Scherer

[57] ABSTRACT

A manual shift tower has a selector lever pivotally mounted for manipulation by an operator along a path to a plurality of forward drive ratio positions and a reverse ratio position. The tower has a solenoid control bellcrank which is operable to position a pin in the path of the lever to permit removal of the shift lever from the reverse ratio position when the solenoid is in a first position. The bellcrank of the solenoid is also drivingly connected with an ignition cable which is operable to position a stop member for preventing removal of the ignition key until the shift lever is in the reverse ratio position and the ignition is turned to "Off".

1 Claim, 3 Drawing Sheets

5,857,938

MANUAL SHIFT CONTROL ASSEMBLY WITH A REVERSE LOCK POSITION

TECHNICAL FIELD

This invention relates to manual shift control assemblies.

BACKGROUND OF THE INVENTION

Manually shifted transmissions have a floor mounted shift tower which is pivotally mounted for movement by the operator to a plurality of positions. The operator manipulates the shift lever along a neutral path into two or more ratio select positions. In each ratio select position, the operator can then manipulate the shaft longitudinally relative to the vehicle to select one of two ratios. For example, a 1–2 ratio position is available, a 3–4 ratio position is available and a 5-reverse position is available in a five speed transmission.

Unlike automatic shifting transmissions, the control for the manual transmission does not have a "Park" position. As is well known in automatic transmissions, the "Park" position is operable to secure the output shaft of the transmission from rotation thus preventing movement of the vehicle when the "Park" position is selected.

It is useful to have a selected position other than neutral to which the manual lever of the manually shifted transmission must be manipulated prior to the operator removing the ignition key and leaving the vehicle.

SUMMARY OF THE INVENTION

It is an object of the present invention to provide an improved manual shift control assembly having a shift tower including a mechanism to ensure a predetermined gear position is selected prior to removal of the ignition key and to maintain the selected gear position when the ignition key is removed.

In one aspect of this invention, a solenoid controlled pin is positionable upon actuation of the solenoid to a first position to prevent the manual shift lever from exiting the reverse ratio position.

In another aspect of this invention, the solenoid can only be actuated to the first position when the ignition key is moved to an "Off" position.

In a further aspect of this invention, the ignition lock mechanism has a blocking member which prevents removal of the ignition key unless the reverse ratio is selected and the solenoid is energized to the first position.

In yet a further aspect of this invention, the solenoid can be actuated to a second position which frees the shift lever for selected manipulation from reverse and also positions the blocking member which will prevent return of the ignition to the lock position. BRIEF DESCRIPTION OF THE DRAWINGS FIG. 1 is an isometric and schematic representation of a transmission shift control system.

DESCRIPTION OF THE EXEMPLARY EMBODIMENT

Figure 1:
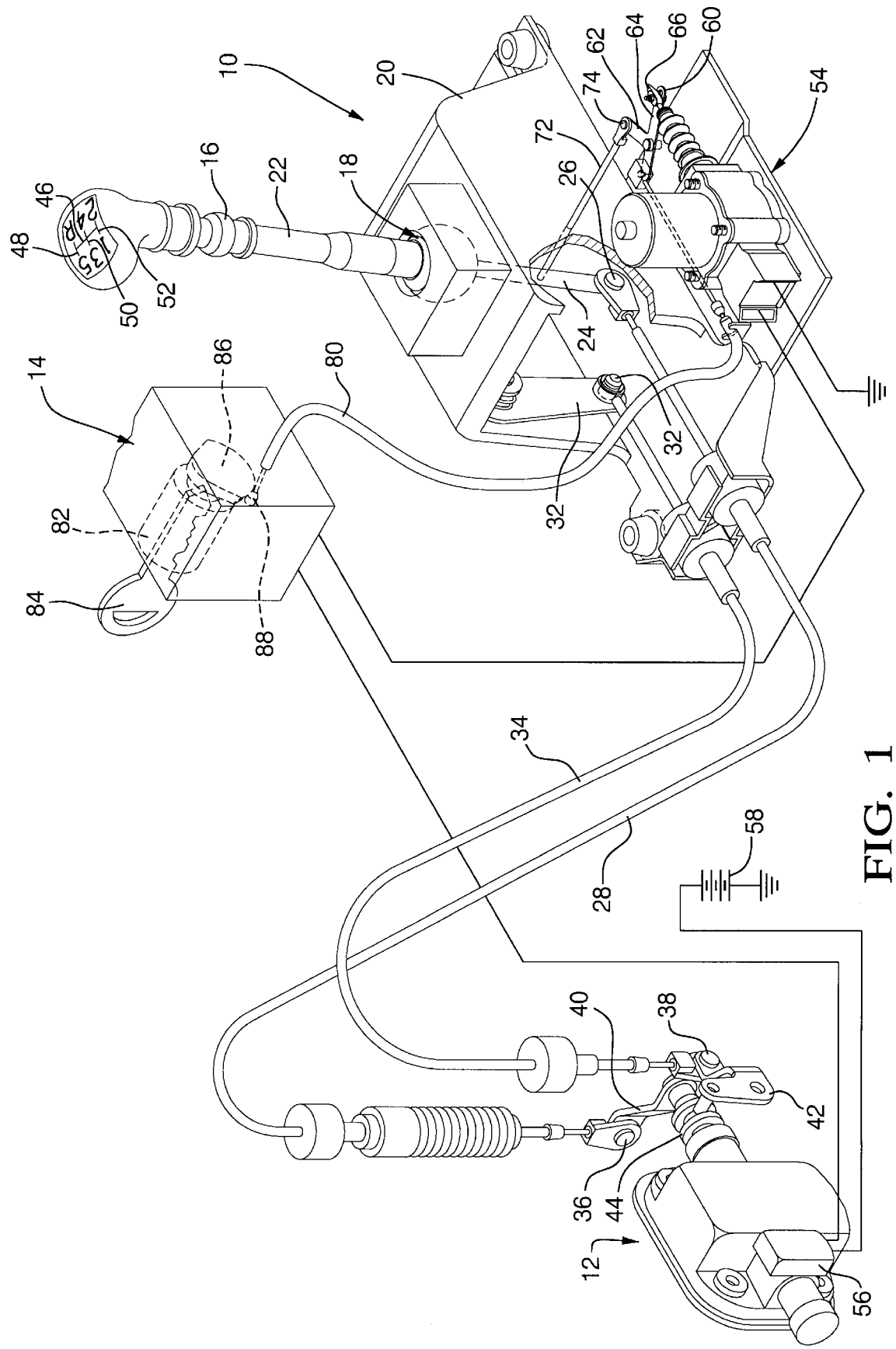

Referring to the drawings, wherein like characters represent the same or corresponding parts throughout the several views, there is seen FIG. 1 a shift control assembly including a shift tower 10, a transmission ratio control 12 and an ignition lock control assembly 14. The shift tower assembly 10 includes a manual shift control lever 16 which is pivotally mounted on a ball joint 18 in a base member 20. The manual lever 16 has an upper rod portion 22 and a lower rod portion 24 disposed above and below the ball joint 18. The lower rod 24 is pivotally connected at a joint 26 with a ratio select cable 28.

Pivotally mounted on the base 20 is a gate select bellcrank 30 which is operatively connected through an arm (not shown) secured at the ball joint 18. This is a conventional connection between the shift lever and the bellcrank 30. The bellcrank 30 has a pivotal connection 32 to which is attached one end of a gate select cable 34.

The ratio select cable 28 engages and gate select cable 34 are connected with pivot joints 36 and 38, respectively, at the transmission ratio control 12. The pivot joint 36 is connected with a lever 40 and the pivot joint 38 is connected with a bellcrank 42. The lever 40 is operative to rotate a control shaft or rod 44 which is a component of the transmission ratio control 12 while the bellcrank 42 is operable to move the rod 44 for and aft.

The bellcrank 42 positions conventional components within the transmission ratio control 12 to various gate select positions while the rotation of the rod 44 by the lever 40 then manipulates shift forks within the transmission in a well known manner to select the desired transmission ratio.

Figure 2:
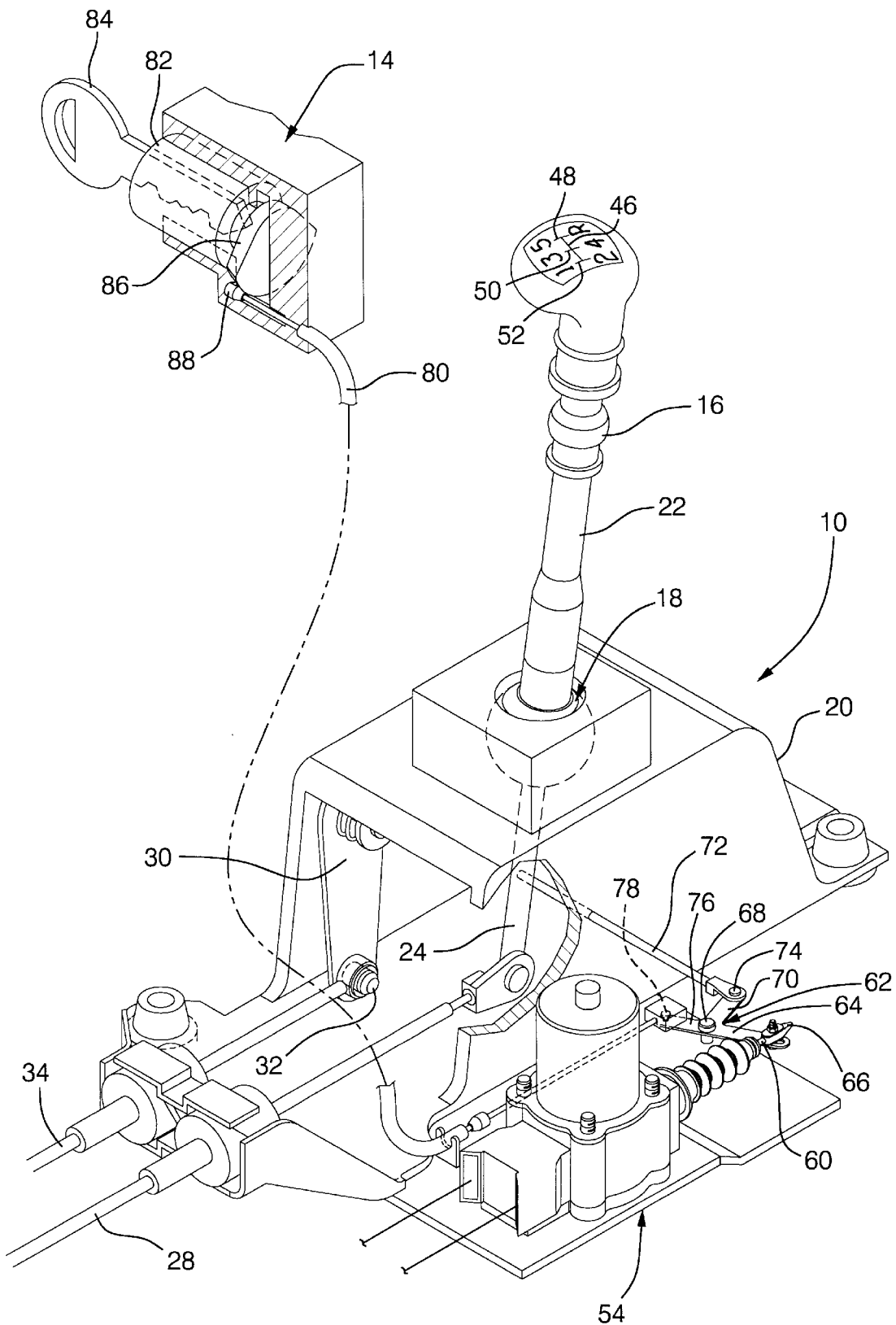
FIG. 2 is an enlarged portion of FIG. 1 with the solenoid in one position and the shift lever restrained in reverse.
Figure 3:
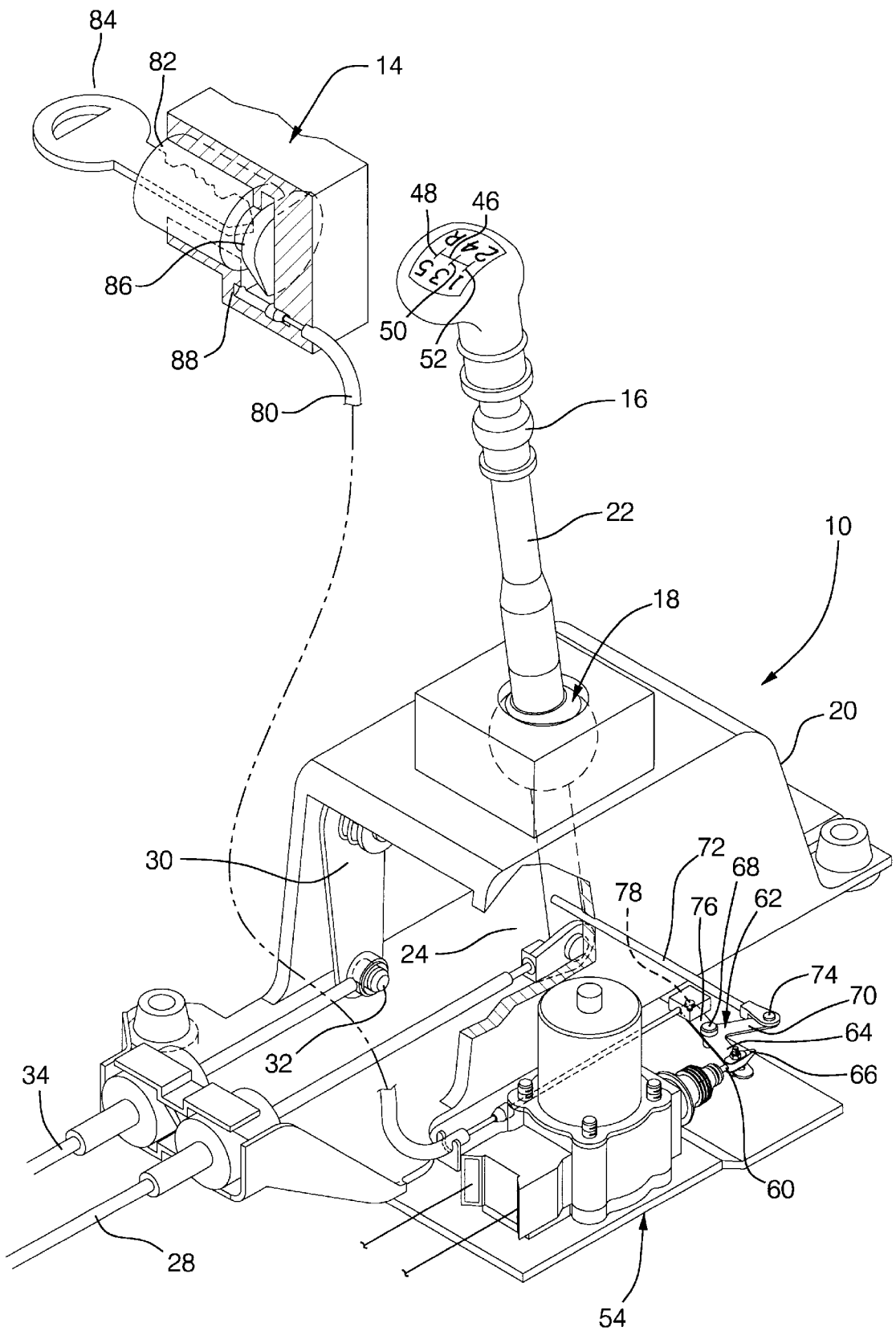
FIG. 3 is a view similar to FIG. 2 with the shift lever unrestrained.

The manual lever 16 is pivotal about the ball joint 18. The pivotal movement is confined to a neutral path 46 and a plurality of ratio paths 48, 50 and 52. Along the neutral path 46, there is no gear selection at the transmission and therefore the transmission is in a neutral condition. However, as the lever 16 is manipulated along the neutral path 46, it becomes aligned individually with each of the paths 48, 50 and 52. For example, at path 52, the lever 16 may be moved longitudinally relative to the base 20 to a first ratio position or aft to the second ratio position. In path 50, the lever 16 may be moved forward to the third ratio position or aft to the fourth ratio position. In path 48, the lever 16 may be moved forwardly to the fifth ratio position and rearwardly to the reverse ratio position, and this is the position shown in FIGS. 1 and 2. The position shown in FIG. 3 is the fifth ratio position.

A solenoid and control 54 is secured to the base 20 and is connected electrically through conventional wiring to a switch 56 disposed on the transmission ratio control 12, the ignition lock 14, and a battery 58. The solenoid and control 54 has an output member 60 which is operable to be positioned in a first position, as shown in FIGS. 1 and 2, and a second position, as shown in FIG. 3. The solenoid and control 54 is operable to drive the solenoid output 60 to the desired positions as will be explained later.

The solenoid and control 54 also includes a bellcrank 62 which has a first arm 64 pivotally and slidably connected through a pin 66 with the solenoid output member 60. The bellcrank 62 is pivotally mounted on a pin 68 and further includes a second arm 70 to which is pivotally mounted a pin 72 by a pivot joint 74. The bellcrank 62 has a third arm 76 which has a pivot connection 78 attached to an ignition cable 80. Thus, the solenoid and control 54 is operable to pivot the bellcrank 62 which, in turn, will cause controlled movement of the pin 72 and the ignition cable 80.

The ignition control assembly 14 includes a lock 82, a key 84 and a cam 86. The cam is rotatable with the lock 82 through manipulation of the key 84. As is well known with ignition control assemblies, the ignition lock member 82 is movable to a plurality of positions including "Lock", "Off", "Run" and "Start". The lock may also be manipulated to one or more accessory positions which will permit the accessories to be operated without the engine being in operation.

The key 84 can only be removed from the ignition lock 82 when the assembly 14 is in the "Lock" position. The key 84 is manipulated to the "Start" position to cause engine starting and is released to the "Run" position to permit continuous running of the engine. The ignition control assembly 14 is manipulated through the use of the key 84 to an "Off" position to discontinue operation of the engine and to the "Lock" position for key removal.

The ignition cable 80 has a stop or blocking member 88 which is linearly movable within the ignition control assembly 14 through manipulation of the bellcrank 62 of the solenoid and control 54. In the position shown in FIG. 2, the stop member 88 is positioned within the control assembly 14 to permit rotation of the ignition lock 82 to the "Lock" position and permit key removal. In the position shown in FIG. 3, the blocking member 88 is disposed to interfere with rotation of the cam 86 thereby preventing rotation to the "Lock" position. However, in FIG. 3, the ignition lock 82 is free to be moved to the other operating positions of the vehicle.

As seen in FIGS. 1 and 2, when the ignition key is in the "Lock" position and the transmission ratio control 12 is in the reverse position, the solenoid and control 54 is pulsed to actuate the solenoid output 60 to the first position shown in FIG. 2. In this position, the pin 72 is manipulated inwardly relative to the base 20 to a position behind the manual lever 16 thereby preventing pivoting of the lever from the reverse position to the neutral path 46. Also, in this position as previously explained, the blocking member 88 is positioned to permit the key to attain the "Lock" position.

When the operator desires to start the vehicle, the ignition control assembly is manipulated to the "Start" position and permitted to return to the "Run" position. At that time, the solenoid control 54 is pulsed to drive the output member 60 to the second position shown in FIG. 3. In this position, it is seen that the pin 72 is moved outwardly relative to the base 20, such that the manual lever 16 is free to be manipulated to any of the drive positions available.

It should also be noted at this time that the ignition cable 80 has positioned the blocking member 88 so as to prevent return of the ignition lock 82 to the "Lock" position. The "Lock" position cannot be attained until the shift lever is returned to the reverse position thereby manipulating the switch 56 and the ignition key is turned to the "Off" position. The solenoid 54 will then be pulsed to the position shown in FIG. 2 permitting the ignition cable to be moved linearly such that the blocking member 88 will permit rotation of the lock 82 to the "Lock" position and the key 84 can be removed.

As described above, it will be appreciated that the transmission shift lever is retained in the reverse position and the key 84 is controlled for removal only under certain conditions by a single solenoid. That is, solenoid 54 is the only electrical unit actuated to provide for the control of the transmission lever and removal of the ignition key.

I claim:

1. A shift control assembly comprising:

a shift tower having a base, and a shift lever pivotally mounted on said base and being selectively movable along a neutral path and ratio paths to a plurality of transmission ratio positions including a reverse position;

a single solenoid secured with said base and having an output member movable to first and second positions;

a bellcrank pivotally mounted on said base having a first arm connected with said solenoid output member, a second arm pivotally connected with a pin and a third arm connected with an ignition cable, said pin being slidably disposed in said base for movement into and out of the path of the shift lever, said pin restraining said shift lever from movement out of said reverse position when said solenoid output member is in said first position;

an ignition control assembly having a rotatable control member, said ignition cable being operative in response to said solenoid output member to prevent rotation of said control member to a lock position when said solenoid output member is in said second position.

\* \* \* \* \*